United States Patent [19]

Bugg et al.

[11] Patent Number: 4,910,595
[45] Date of Patent: Mar. 20, 1990

[54] TELETEXT DECODERS

[75] Inventors: Richard E. F. Bugg, Coulsdon; David R. Tarrant, Sutton, both of England

[73] Assignee: U.S. Philips Corporation, New York, N.Y.

[21] Appl. No.: 356,032

[22] Filed: May 23, 1989

[30] Foreign Application Priority Data

May 27, 1988 [GB] United Kingdom ............. 8812592.7
May 5, 1989 [GB] United Kingdom ............. 8910338.6

[51] Int. Cl.4 ............................................. H04N 7/087
[52] U.S. Cl. ..................................... 358/147; 358/142
[58] Field of Search ................ 358/141, 142, 146, 147

[56] References Cited

U.S. PATENT DOCUMENTS 4,719,510 1/1988 Kinghorn ........................... 358/142

OTHER PUBLICATIONS

Data Sheet for SAA9040; "Computer Controlled Teletext Extension" by Mullard; Mar. 1986; pp. 593-602.
Mullard Application Laboratory; Mitcham; "Computer Controlled Teletext: User's Manual", by Kinghorn; 11/1/83.

Primary Examiner—John W. Shepperd
Assistant Examiner—Michael D. Parker
Attorney, Agent, or Firm—Thomas A. Briody; Jack E. Haken; William Squire

[57] ABSTRACT

A teletext decoder is provided with a page memory having rows (R0 to R73) for storing corresponding packets of teletext data, the page memory being provided with at least one extra memory bit (F1, F2) for each row thereof, the extra memory bits constituting flags (F1, F2) which may be selectively set by the processor software in order to initiate selective action in respect of those packets which correspond to the flagged rows. The selective action might be to permit or prevent packets being written into memory or to alert the processor that immediate processing of a flagged packet is required.

18 Claims, 5 Drawing Sheets

TELETEXT DECODERS

This invention relates principally to a teletext decoder for teletext information which consists of a plurality of different pages each of which is identified by a respective page number and each of which comprises a plurality of data packets, said teletext decoder including processor means, means for selecting a page by its page number, means for detecting a selected page number when received, and at least one page memory for storing each received data packet of a selected page, said page memory comprising a plurality of rows for storing corresponding data packets of said selected page. The invention also relates to a method of processing teletext information.

The document "Broadcast Teletext Specification", September 1976, published jointly by British Broadcasting Corporation, Independent Broadcasting Authority and British Radio Equipment Manufacturers' Association, discloses a specification for transmitting teletext information in 625-line television systems.

Proposals for enhancing the teletext specification given in the said "Broadcast Teletext Specification" are given in the document "World System Teletext and Data Broadcasting System- Technical Specification", December 1987, compiled by the Department of Trade and Industry of the U.K. Government.

The teletext information is usually transmitted as part of the television signal in television lines where no normal television picture information is present. Initially, teletext transmissions in the United Kingdom used as teletext data lines television lines 17 and 18 in first fields and television lines 330 and 331 in second fields of the field or vertical blanking intervals (VBI), but current teletext transmissions in the United Kingdom now use at least six television lines in each VBI as data-lines. The VBI transmission is thus, in effect, multiplexed with the normal picture transmission and the teletext information transmitted in this way and representing data for display such as text and graphics can be displayed at a teletext television receiver as a selectable alternative to the normal picture information.

In the above-identified document "Broadcast Teletext Specification", a quantity of teletext information to be considered as an entity is termed a page and all of the pages which are available are normally transmitted in a recurrent cycle, with or without up-dating page information, as appropriate. At a teletext decoder any page can be selected, and the digitally coded data representing the page information is then acquired by the teletext decoder from the cyclic transmission and is stored in a page memory of the teletext decoder for as long as the page is required. A teletext decoder may have a multipage memory having a plurality of memory portions in which individual pages can be stored.

A teletext page can consist of up to 74 data packets, each packet comprising 40 bytes for 625 lines transmission systems. Packets 0-23 are used to define the basic teletext display page, and the remaining packets, commonly referred to as "EXTENSION" packets, are used to help control the teletext decoder or to supply additional information so that superior decoders can enhance the appearance of the basic display page. The enhancements may take the form of accented characters, pastel colours instead of fully intensity colours, improved graphics, etc.

In addition there are 384 packets which can be used to described magazine or channel parameters. They do not form part of a teletext page, i.e. their reception does not require a page header to have been previously captured. They can be considered as stand-alone packets and are stored in a particular part of the teletext decoder memory.

Although the aforementioned "World System Teletext and Data Broadcasting System-Technical Specification" allows for all the above mentioned packets and a teletext decoder can be designed to capture them all, in practice, only sub-sets of all possible packets are actually transmitted. This determines the quantity of memory that should be reserved in memory for the storage of one teletext page (including the extension packets). For example, in Germany only packets 0-23 are in current use; in U.K. packets 0-23 and 24, 27 and 30 are in current use and in Spain packets 0-23 and packet 26 are in current use. Whilst it is desirable to design a single teletext decoder that satisfies the requirements of all possible markets, it should, at the same time, be capable of optimum performance in each market.

In order to permit the capture of all possible packets, the page memory of a teletext decoder needs to be provided with 74 "rows" each of 40 bytes. If such a decoder was used at the present time in Germany, then only rows 0-23 of the page memory would be used and the remainder (two-thirds) of the memory would never be used since no extension packets are currently transmitted in Germany. Thus two-thirds of the memory capacity is wasted.

It is one object of the present invention to provide a teletext decoder which enables an under-used page memory to be more efficiently used.

Another problem which can exist in present day teletext decoders, is that for certain extension packets the decoder processor is required to commence the processing of the extension packet as soon as it has been received. For example, a packet 27 contains the page numbers to be associated with coloured buttons provided on a text television remote control for a teletext receiver which is provided with so-called "Fastext". One of these pages may be the next page to be transmitted. The teletext decoder has to process the packet 27, sort out the page number, allocate the pages to an area of memory and make the page request in the acquisition channels. If these tasks take longer than the time it takes for the current page to be fully acquired then the new page requests will not be in place by the time the next page header is received. Thus there is a danger of missing the required page, resulting in a delay of one cycle of the database, typically 20 seconds before it is acquired.

One method of detecting the arrival of a packet is for the processor to poll the memory locations where the packet will be written. This can be a lengthy procedure, especially as current processors have to communicate via an interface bus which has a restricted bandwidth-typically having a maximum bit rate of 100 K bits/sec. Whilst polling, the processor is prevented from performing other tasks, perhaps the interpretation of a new remote control command and the overall performance can be compromised.

It is a further object of the present invention to provide a teletext decoder having an improved arrangement for detecting the arrival of a required packet.

According to one aspect of the present invention there is provided a teletext decoder for teletext information which consists of a plurality of different pages each of which is identified by a respective page number and each of which comprises a plurality of data packets, said teletext decoder including processor means, means for selecting a page by its page number, means for detecting a selected page numer when received, and at least one page memory for storing each data packet of a selected page, said page memory comprising a plurality of rows for storing corresponding data packets of said selected page, said teletext decoder being characterised by means for providing a flag relating to each of the rows of said page memory, said flags being selectively settable under the control of said processor means, said flags when set being used to initiate selective action in respect of the data packets which correspond to the rows of said page memory to which said set flags relate.

In one preferred arrangement for carrying out the invention a teletext decoder according to the aforesaid first aspect is characterised in that the selective action initiated by said set flags is to permit the data packets corresponding to the rows of said page memory which relates to said set flags to be stored in said rows, and to prevent the data packets corresponding to the rows of said page memory which relate to flags which are not set from being stored in said rows.

In this way the rows of the page memory which relate to flags which are not set may be used for storage purposes under the control of said processor means i.e. under the control of the software writer.

In another preferred arrangement for carrying out the invention, a teletext decoder according to the aforesaid first aspect is characterised in that the selective action initiated by said set flags is to effect an interrupt procedure on the arrival of a data packet in the corresponding row of said page memory to which said set flag relates.

The interrupt procedure may be used to cause said processor means to suspend its current tasks and to process the contents of said data packet. Thus, when a packet 27 is being received, it can be arranged that the flag in its respective row in the page memory will be set, to effect the interrupt procedure as soon as the packet is received. The processor means then suspends its current tasks and takes the necessary action to make the requisite page requests before the current page has been fully acquired. In this way the decoder will be set to receive the immediately following page if it is one of those selected by the packet 27 data.

Advantageously, the means for providing a flag relating to each of the rows of said page memory takes the form of an extra memory bit provided in each of the rows of said page memory.

It is preferably arranged that two extra memory bits are provided in each of the rows of said page memory, one of said extra memory bits being used for selectively setting flags to permit or prevent data packets being stored in corresponding rows of said page memory, and the other of said extra memory bits being used for selectively setting flags to initiate or prevent said interrupt procedure.

According to a further aspect of the present invention there is provided a method of decoding teletext information which consists of a plurality of different pages each of which is identified by a respective page number and each of which comprises a plurality of data packets, said method comprising the steps of selecting a page by its page number, detecting a selected page number when it is received, and storing each data packet of a selected page in a page memory which comprises a plurality of rows for storing corresponding data packets of said selected page, said method being characterised by the further steps of providing a flag relating to each of the rows of said page memory, and selectively setting the flags under the control of processor means, said flags when set being used to initiate selective action in respect of the data packets which correspond to the rows of said page memory to which said set flags relate.

One preferred method in accordance with the aforesaid further aspect is characterised in that the selective action initiated by said set flags is to permit the data packets corresponding to the rows of said page memory which relate to said set flags to be stored in said rows, and to prevent the data packets corresponding to the rows of said page memory which relate to flags which are not set from being stored in said rows.

Another preferred method in accordance with the aforesaid further aspect is characterised in that the selective action initiated by said set flags is to effect an interrupt procedure on the arrival of a data packet in the respective row of said page memory to which said set flag relates.

It is preferably arranged that a method in accordance with the aforesaid further aspect is characterised by the step of providing an extra memory bit in each of the rows of said page memory, said memory bit constituting said settable flag.

In order that the invention may be more fully understood reference will now be made by way of example to the accompanying drawings, of which:

Figure 1:
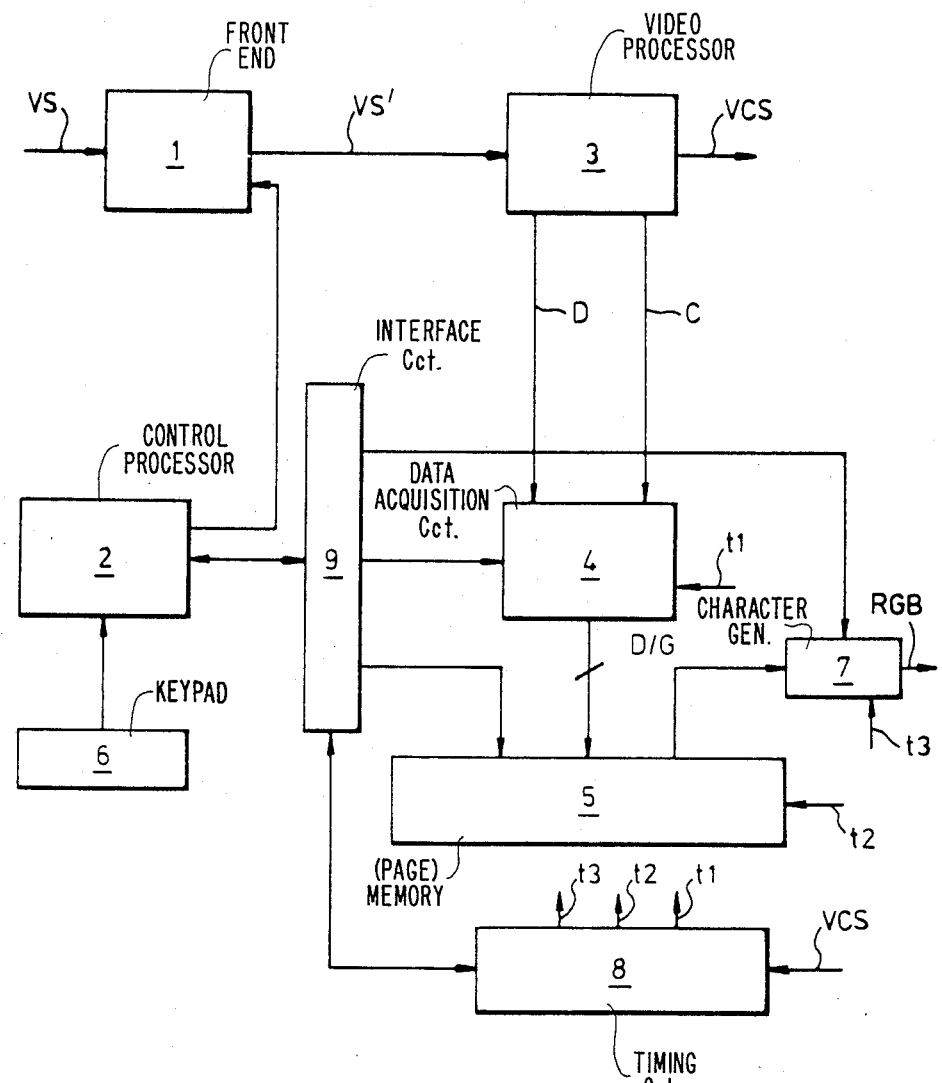
FIG. 1 is a block diagram of a teletext decoder in which the invention is embodied.

Referring to the drawings, the teletext decoder shown in FIG. 1 has a front end 1 for receiving an incoming television signal VS which is encoded with teletext data. This front end 1 comprises the usual amplifying, tuning and i.f. detector circuits and is under tuning control of processor means 2. The demodulated video signal VS' produced at the output of the front end 1 is applied to a video processor circuit 3 which performs data slicing for retrieving teletext data pulses D from the video signal VS'. The video processor circuit 3 also produces input data clock pulses C from the data pulses D. The data pulses D are fed together with the clock pulses C to a data acquisition circuit 4 which is operable to feed selected groups D/G of the data pulses to a memory 5 as address, message and control information. The memory 5 has a capacity for storing a plurality of pages, each comprising a plurality of data packets, in respective page memory sections, which are conveniently referred to as chapters, a data acquisition circuit 4 being provided in respect of each page that can be stored.

The processor means 2 is operable in accordance with 'select' signals applied to it from a user keypad 6 to control channel selection and which pages, as composed of the selected groups D/G of the data pulses, are acquired by the data acquisition circuit 4 and stored in the memory 5. Message information stored in the memory 5 is used to drive a character generator 7 which produces R,G,B component signals for display purposes, under the control of a timing circuit 8 which provides timing signals on connections t1, t2 and t3 for the circuit elements 4, 5 and 7. These circuit elements and the timing circuit 8 are accessed by the processor means 2 via an interface circuit 9. The operation of the timing circuit 8 is synchronised with the received video signal VS by a composite pulse signal VCS which contains the line and field synchronising pulses which are separated from the demodulated video signal VS' in the video processor circuit 3.

As has already been mentioned, the memory 5 has the capacity for storing a plurality of different pages under the control of the keypad 6.

The aforementioned "Braodcast Teletext Specification" defined a page for storage in the memory 5 and for subsequent display on a television receiver as comprising 24 rows each of 40 characters. Each of the characters is defined by an 8-bit byte. The teletext display data therefore consists of 24 rows, or data packets, as they have subsequently come to be called, each of 40 bytes. The 24 data packets are conveniently referred to as data packets 0, corresponding to the page header data packet, to 23.

The aforementioned "World System Teletext and Data Broadcasting System-Technical Specification" relates to an enhanced teletext specification in which additional information is transmitted to the teletext decoder in the form of additional "extension" packets numbered 24 to 31 which do not form part of the basic display page. The extension packets 24 and 25 have the same format as normal data packets and contain 40 8-bit bytes which can be used for additional page related display data to give user control information for more sophisticated decoders. Extension packet 26 is used to provide enhanced display facilities, extension packet 27 is used to define linked page addresses required for so-called "Fastext" operation, and extension packet 28 is used to redefine the character set and the colours to be used when displaying the basic page. Each of the extension packets 26 to 28 can be transmitted in up to sixteen versions and so each take up 16 rows in the page memory.

Extension packets 24 to 28 are all page related in that, where applicable, they are transmitted each time a page is transmitted and are associated with a page header (packet 0).

Extension packets 29 to 31 are non-page related packets in that they are not transmitted for each page. Extension packet 29 is used to redefine the character set and colours to be used throughout a particular group of pages, more usually referred to as a "magazine", extension packet 30 is used to give general information on the transmission and is called the "broadcasting service data" packet, and extension packet 31 is used for commercial data services.

Figure 2:
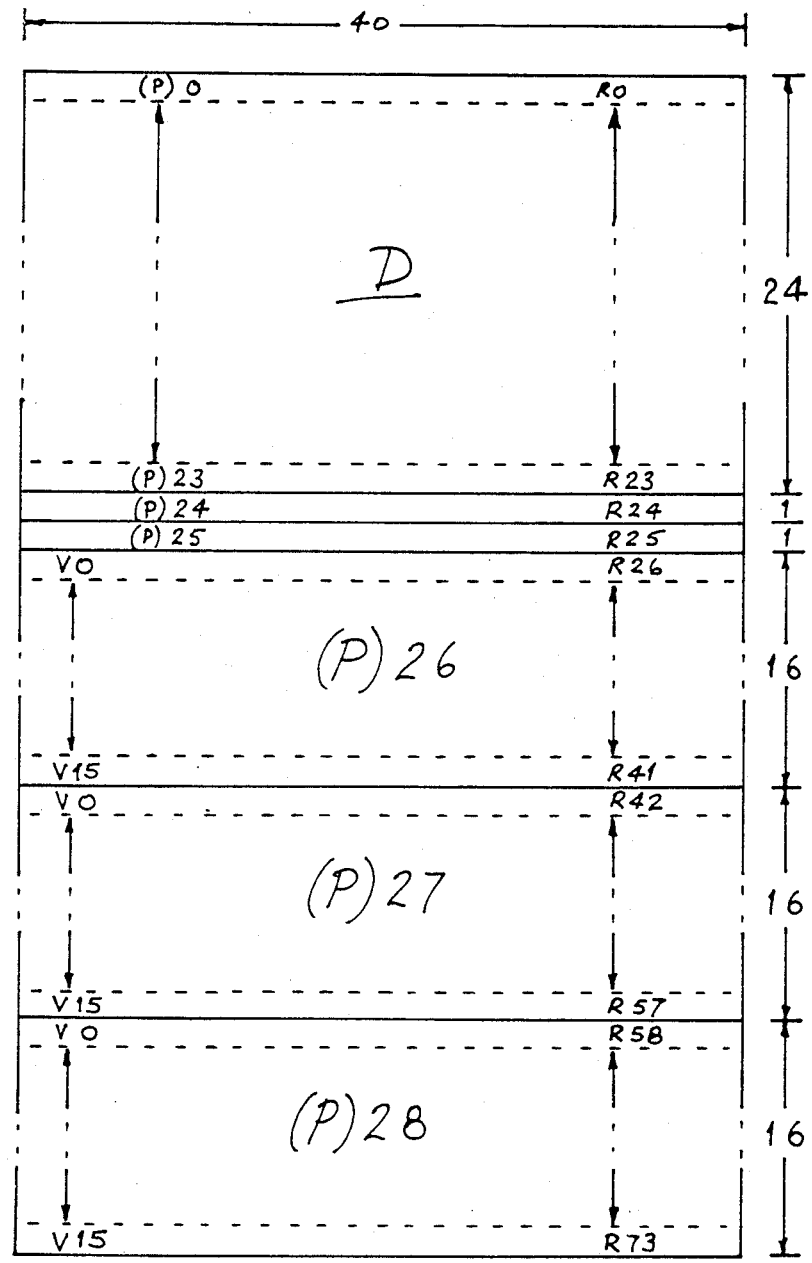
FIG. 2 is a diagrammatic representation of a typical conventional teletext page stored in the memory of FIG. 1.

A typical page format as defined by the aforementioned "World System Teletext and Data Broadcasting System-Technical Specification" is shown in FIG. 2 of the accompanying drawings. The teletext page shown in FIG. 2 comprises a display area D which corresponds to the actual teletext page which is displayed on a television receiver. The display area consists of 24 rows R0 to R23, each of which consists of 40 bytes. In rows R0 to R23 are stored data packets (P)0 to (P)23 respectively. Extension data packet (P)24 is stored in row R24; extension packet (P)25 is stored in row R25; versions V0 to V15 of extension packet (P)26 are stored in rows R26 to R41; versions V0 to V15 of extension packet (P)27 are stored in lines R24 to R57 and versions V0 to V15 of extension packet (P)28 are stored in rows 58 to 73. The page shown thus consists of 74 rows each of 40 bytes. The non-page related packets, 29, 30 and 31 are not shown.

In order to be able to store a full teletext page as shown in FIG. 2, it is necessary to provide the page memory of the teletext decoder with 74 rows each of 40 bytes. However, as has already been explained, at the present time not all of the available data packets (P)0 to (P)28 are transmitted, and different countries transmit different sub-sets of the available data packets. As has been explained, in Germany only packets (P)0 to (P)23 are transmitted which means that a page memory of 74 rows is used to a third of its capability.

Figure 3:
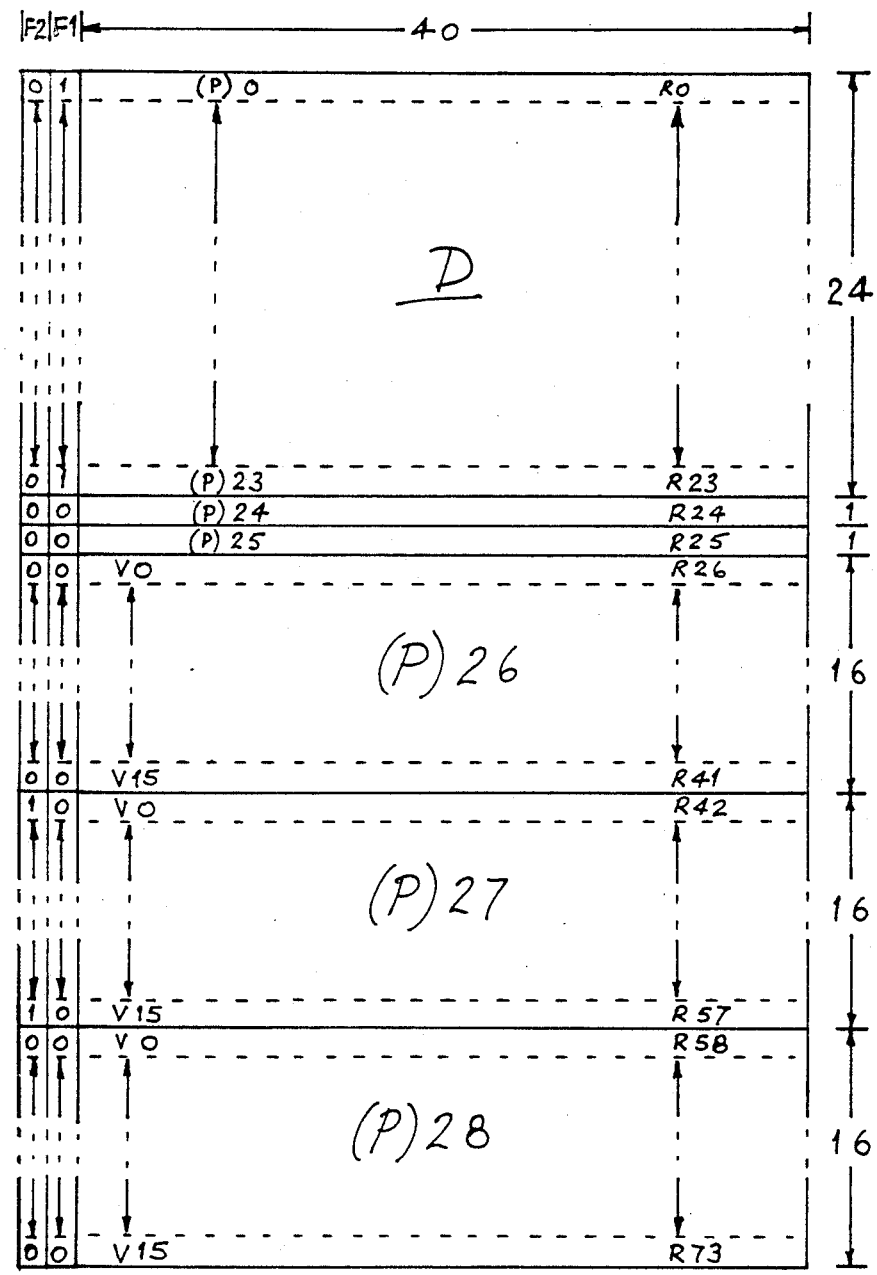
FIG. 3 shows the teletext page of FIG. 2 modified in accordance with the present invention.

In FIG. 3 of the drawings, there is shown a modification of the typical page format described with reference to FIG. 2 which enables greater utilisation of the page memory. This is achieved by providing each of the rows R0 to R73 of the page with two extra memory bits F1 and F2 located at the beginning of each of the rows R0 to R73, neither of which bits form part of the display page D. For the moment, only memory bit F1 will be considered.

The memory bit F1 is used to permit a "CAPTURE PACKET" flag to be set in respect of each of the rows R0 to R73 of the teletext page. The F1 flags will be set by the software written into the processor 2 (FIG. 1) of the teletext decoder, and this can be varied dependent upon the particular market the teletext decoder is meant to serve. It is arranged, for example, that if an F1 flag is set high (logic '1') the associated packet (assuming it forms part of the requested page) will be captured and written into the allocated row of the page memory, but if the F1 flag is set low (logic '0') the associated packet will not be captured and so will not be written into the allocated row of the page memory. Thus the processor 2 software writer needs only to set those F1 flags associated with the packets required by the chosen application/market area. This ensures that the remaining memory is never overwritten by the teletext transmission. This facility therefore defines rows in the page memory which are under the complete control of the processor software. The software writer may choose to use these rows for the storage of additional teletext pages. With reference to FIG. 3, suppose that no extension packets are required, then the F1 flags relating to rows R0 to R23 would be set high by the processor software and the F1 bits relating to rows R24 to R73 would be set low. When the requested page is received only the display packets (P)0 to (P)23 will be written into memory, leaving the rows R24 to R27 free for use by the processor.

One possible use for the unused memory capacity might be to store extra teletext pages. This may be achieved by transferring a page which has already been stored in rows R0 to R23 of the page memory to, say, rows R24 to R47 of the memory and requesting a second page for rows R0 to R23. When the second page has been captured and stored it may be transferred to, say, rows R48 to R72 and a third page requested for rows R0 to R23. In this way 72 of the 74 rows of the page memory are utilised and three pages of teletext data are available for a user instead of one.

Figure 4:
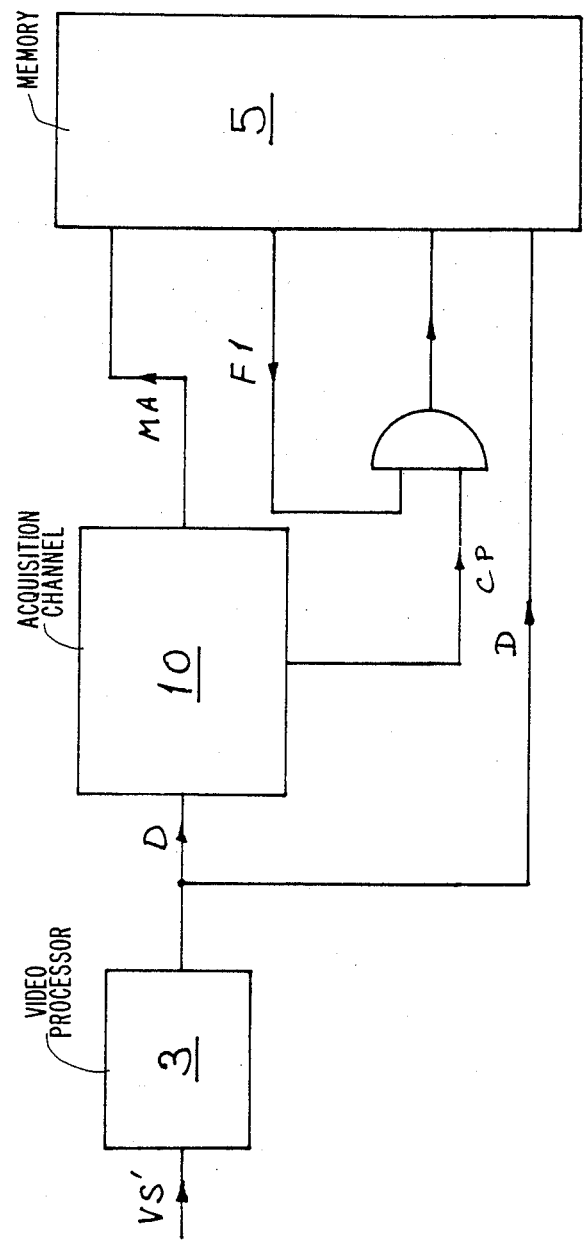
FIG. 4 is a block diagram showing elements of the teletext decoder of FIG. 1 in greater detail to enable so-called "CAPTURE PACKET" to be effected.

In FIG. 4 of the drawings there is shown an arrangement for effecting the "CAPTURE PACKET" feature just described. The arrangement shown in FIG. 4 depicts the video processor circuit 3 of FIG. 1 having the demodulated video signal VS' applied to it. The teletext data pulses D from the video processor circuit 3 are applied to an acquisition channel 10 which forms part of the data acquisition circuit 4 of FIG. 1 and to the memory 5 also of FIG. 1. The acquisition channel 10 checks to see if each incoming packet is required i.e. does the packet belong to a page that has been requested? and if it is required, it sets a "CORRECT PACKET" signal CP high (logic '1'). It also determines a memory address MA for each packet in the page memory 5. The memory 5 is organised in accordance with the teletext page described with reference to FIG. 3, in that each row thereof is provided with an F1 memory bit which is set by means of the processor 2 (FIG. 1) software, as has been described, in order to indicate whether a particular packet should be stored in the memory or not. When the memory address MA is determined the F1 flag relating to that address is read out of memory 5. The "CORRECT PACKET" signal CP and the flag F1 are applied to an AND gate G1 to provide a write enable signal W for memory 5. If the "CORRECT PACKET" signal CP and the flag F1 are both high the teletext data pulses D are written into the memory 5 at the memory location determined by the acquisition channel 10. If the F1 flag had been set low the incoming data pulses would be blocked by the AND gate and the data pulses would not be written into memory. Thus, as has already been described, dependent upon the number of F1 flags that have been set by the processor 2 (FIG. 1) software, some rows of the page memory will be available for storage purposes under the control of the processor 2 (FIG. 1).

A similar procedure to that described above for setting the F1 "CAPTURE PACKET" flags may be used for indicating to the processor 2 (FIG. 1) when a packet has been received which requires immediate processing. This is achieved by providing each of the rows of the page memory 5 (FIG. 3) with an additional flag which may be set by means of the processor 2 software to indicate the particular packets (e.g. packets 27) that require immediate processing. This additional flag is afforded by the extra memory bit F2, as shown in FIG. 3, which is provided in respect of each row of the teletext page. The F2 flag would be set high (logic '1') by the processor 2 software for each particular packet that requires immediate processing. If, for example, it is decided that only packet 27 of a teletext page is required to effect immediate processing by the processor 2, then the processor 2 software is arranged so that the F2 flags in rows R42 to R57 of the page memory are set high and the remaining F2 flags are set low (logic '0'). When each packet of a teletext page is then received, the F2 flag is inspected to see whether it has been set and if it has then the processor 2 suspends its immediate tasks and processes the appropriate packet. Once the processing of the packet has been done, the processor resumes its usual tasks.

Figure 5:
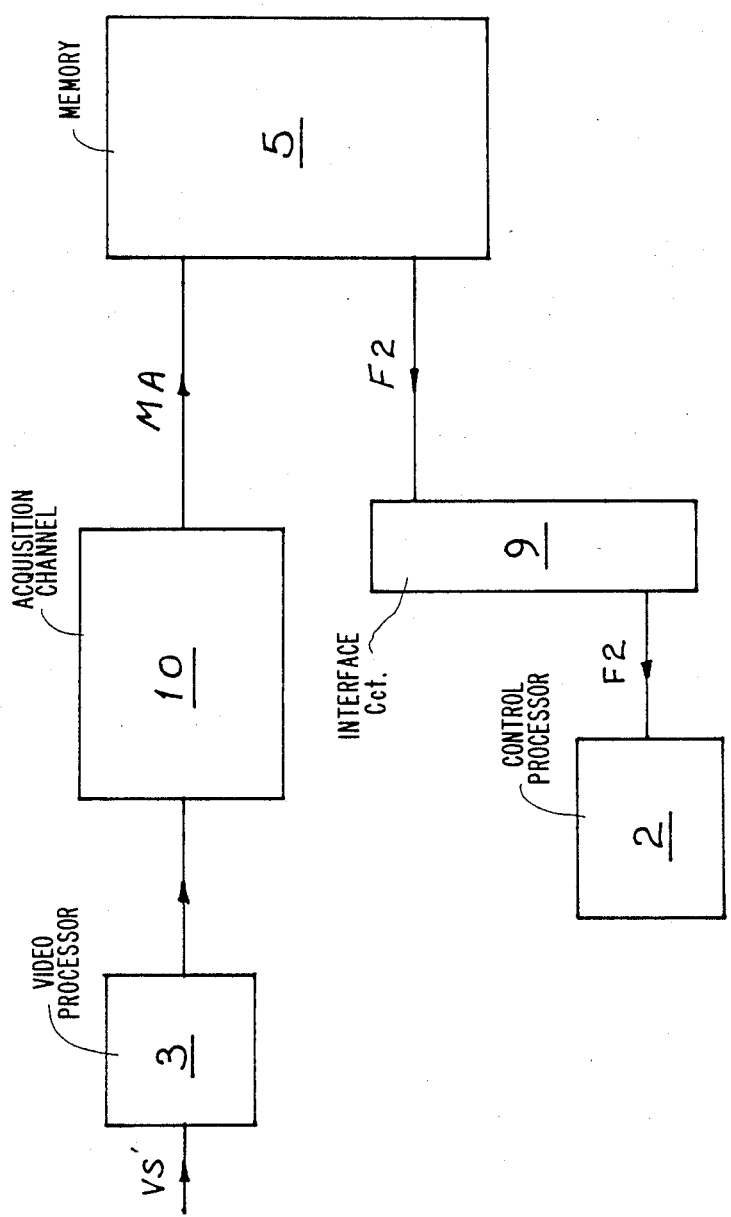
FIG. 5 is a block diagram showing elements of the teletext decoder of FIG. 1 in greater detail to enable so-called "PACKET INTERRUPT" to be effected.

In FIG. 5 of the drawings there is shown a modification of the arrangement shown in FIG. 4 for effecting the "PACKET INTERRUPT" feature just described. The arrangement shown in FIG. 5 depicts the video processor circuit 3 which receives the demodulated video signal VS' and which affords teletext data pulses D to the acquisition channel 10. The acquisition channel 10 determines the memory address MA of each packet as it is received and reads the F2 flag relating to address from the page memory 5. The output from the F2 flag is fed back to the processor 2 via the interface 9 (see FIG. 1) so that if the F2 flag is set in respect of a particular packet, the processor means 2 knows that it must interrupt its current tasks and process the received packet. Thus, the processing of the packet may be completed before the current page has been fully acquired.

It should be appreciated that for simplicity of explanation, in the teletext decoders that have been described only one page memory has been considered whereas in practice a plurality of acquisition channels may be provided which may correspond to the number of magazines, each being provided with its own page memory. It should also be appreciated that the principles described relating to the F1 and F2 flags may also be applied to the non-page related extension packets 29 to 31 which are normally stored in a further portion of the teletext decoder memory.

It should also be appreciated that although in the foregoing descriptive embodiments, the use of F1 and F2 flags have been described, it is to be understood that a teletext decoder in accordance with the present invention may be provided with an arrangement for implementing either one or the other or both flag arrangements as may be required.

From reading the present disclosure, other modifications will be apparent to persons skilled in the art. Such modifications may involve other features which are already known per se and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation or modification thereof which would be apparent to persons skilled in the art, whether or not it relates to the same invention as presently claimed in any claim and whether or not it mitigates any or all of the same technical problems as does the present invention. The applicants hereby reserve the right to formulate new claims to such features and/or combinations of such features during the prosecution of the present application or of any further application derived therefrom.

We claim:

1. A teletext decoder for teletext information which consists of a plurality of different pages each of which is identified by a respective page number and each of which comprises a plurality of data packets, said teletext decoder including processor means, means for selecting a page by its page number, means for detecting a selected page number when received, and at least one page memory for storing each data packet of a selected page, said page memory comprising a plurality of rows for storing corresponding data packets of said selected page, said teletext decoder being characterised by means for providing a flag relating to each of the rows of said page memory, said flags being selectively settable under the control of said processor means, said flags when set being used to initiate selective action in respect of the data packets which correspond to the rows of said page memory to which said set flags relate.

2. A decoder as claimed in claim 1, characterised in that the selective action initiated by said set flags is to permit the data packets corresponding to the rows of said page memory which relate to said set flags to be stored in said rows, and to prevent the data packets corresponding to the rows of said page memory which relate to flags which are not set from being stored in said rows.

3. A decoder as claimed in claim 2, characterised in that the rows of said page memory which relate to flags which are not set are used for storage purposes under the control of said processor means.

4. A decoder as claimed in claim 1, characterised in that the selective action initiated by said set flags is to effect an interrupt procedure on the arrival of a data packet in the corresponding row of said page memory to which said set flag relates.

5. A decoder as claimed in claim 4, characterised in that the interrupt procedure causes said processor means to suspend its current tasks and to process the contents of said data packet.

6. A decoder as claimed in any preceding claim, characterised in that the means for providing a flag relating to each of the rows of said page memory takes the form of an extra memory bit provided in each of the rows of said page memory.

7. A decoder as claimed in claim 1, characterised in that:
 (a) the selective action indicated by said set flags is to
  (i) permit the data packets corresponding to the rows of said page memory which relate to said set flags to be stored in said rows;
  (ii) prevent the data packets corresponding to the rows of said page memory which relate to flags which are not set from being stored in said rows; and
  (iii) effect an interrupt procedure on the arrival of a data packet in the corresponding row of said page memory to which said set flags relate; and
 (b) the means for providing a flag relating to each of the rows of said page memory takes the form of an extra memory bit provided in each of the rows of said page memory.

8. A decoder as claimed in claim 7, characterised in that two extra memory bits are provided in each of the rows of said page memory, one of said extra memory bits being used for selectively setting flags to permit or prevent data packets being stored in corresponding rows of said page memory, and the other of said extra memory bits being used for selectively setting flags to initiate or prevent said interrupt procedure.

9. A television receiver incorporating a teletext decoder as claimed in claim 1.

10. A television receiver incorporating a teletext decoder as claimed in claim 2.

11. A television receiver incorporating a teletext decoder as claimed in claim 3.

12. A television receiver incorporating a teletext decoder as claimed in claim 4.

13. A television receiver incorporating a teletext decoder as claimed in claim 5.

14. A television receiver incorporating a teletext decoder as claimed in claim 6.

15. A method of decoding teletext information which consists of a plurality of different pages each of which is identified by a respective page number and each of which comprises a plurality of data packets, said method comprising the steps of selecting a page by its page number, detecting a selected page number when it is received, and storing each data packet of a selected page in a page memory which comprises a plurality of rows for storing corresponding data packets of said selected page, said method being characterised by the further steps of providing a flag relating to each of the rows of said page memory, and selectively setting the flags under the control of processor means, said flags when set being used to initiate selective action in respect of the data packets which correspond to the rows of said page memory to which said set flags relate.

16. A method as claimed in claim 15, characterised in that the selective action initiated by said set flags is to permit the data packets corresponding to the rows of said page memory which relate to said set flags to be stored in said rows, and to prevent the data packets corresponding to the rows of said page memory which relate to flags which are not set from being stored in said rows.

17. A method as claimed in claim 15, characterised in that the selective action initiated by said set flags is to effect an interrupt procedure on the arrival of a data packet in the respective row of said page memory to which said set flag relates.

18. A method as claimed in any of claims 15 to 17, characterised by the step of providing an extra memory bit in each of the rows of said page memory, said memory bit constituting said settable flag.

* * * * *